F. E. THELEN.
AUTOMOBILE FENDER.
APPLICATION FILED OCT. 4, 1915.
1,178,970.
Patented Apr. 11, 1916.
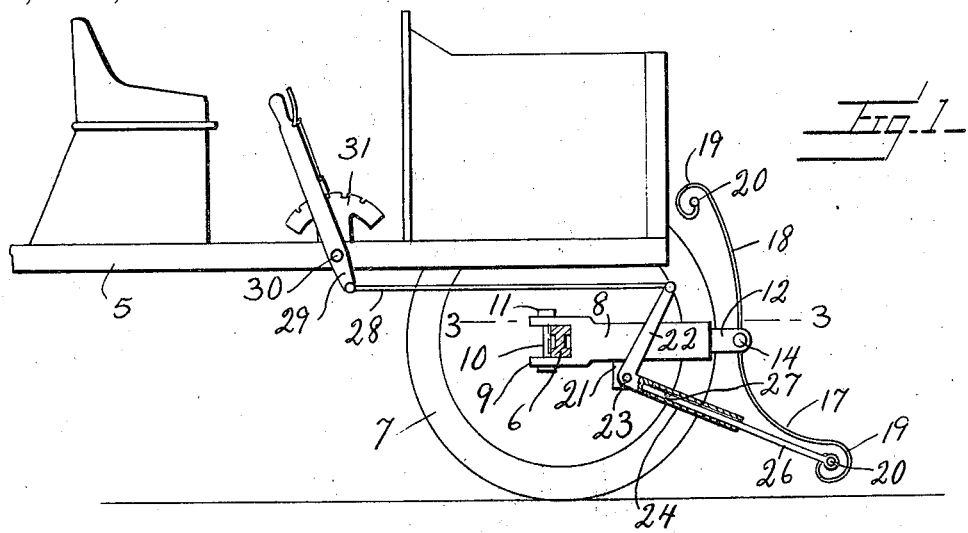
Fig. 1.
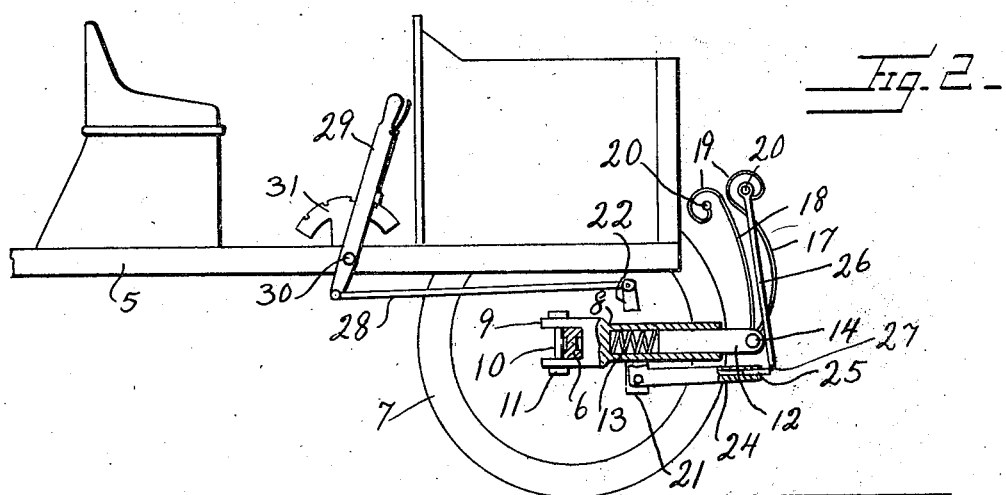
Fig. 2.
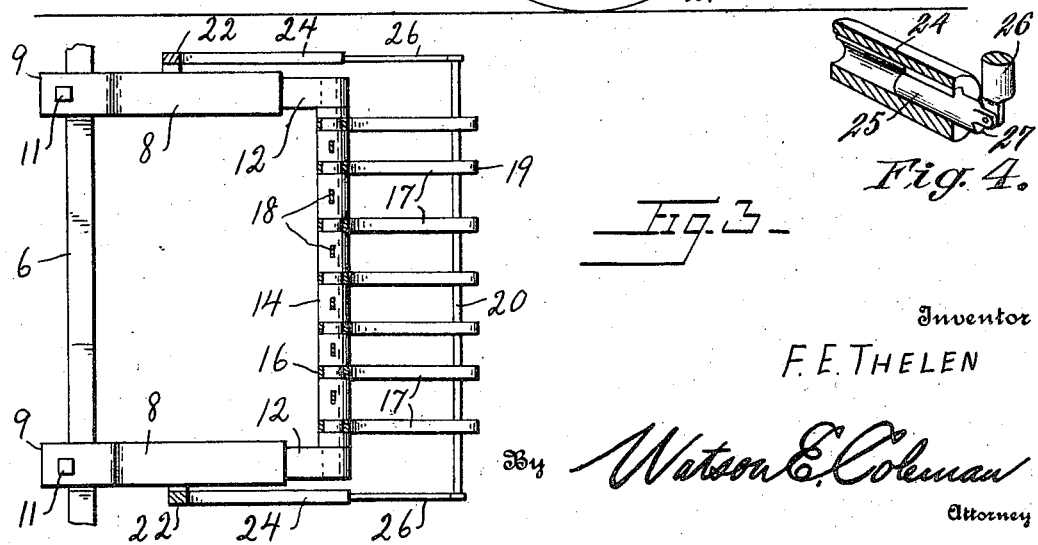
Fig. 3.
Fig. 4.
Inventor
F. E. THELEN
By Watson E. Coleman
Attorney

UNITED STATES PATENT OFFICE.

FRANK E. THELEN, OF ROCKFORD, ILLINOIS.

AUTOMOBILE-FENDER.

1,178,970.  Specification of Letters Patent.  Patented Apr. 11, 1916.

Application filed October 4, 1915. Serial No. 54,047.

*To all whom it may concern:*

Be it known that I, FRANK E. THELEN, a citizen of the United States, residing at Rockford, in the county of Winnebago and State of Illinois, have invented certain new and useful Improvements in Automobile-Fenders, of which the following is a specification, reference being had to the accompanying drawings.

This invention relates to an improved automobile fender and has for its primary object to provide a very simply constructed device of this character which may be easily and quickly operated by the driver of the machine to prevent the wheels thereof from striking the body of a person in the event of a collision.

The invention has for another important object to provide a fender which is so constructed and mounted upon the vehicle that the same may be compactly folded.

The invention has for a still further object to provide a fender construction wherein the fender body is yieldingly mounted or supported so that the person struck thereby will not be seriously injured.

The invention has for a further general object to improve and simplify the construction of devices of the above character whereby the same may be readily applied to motor vehicles of the various types now in general use without necessitating any material alterations therein.

With the above and other objects in view, my invention consists in the novel features of construction, combination and arrangement of parts to be hereinafter more fully described, claimed and illustrated in the accompanying drawing, in which, Figure 1 is a side elevation of a portion of a motor vehicle showing my improved fender applied thereto; Fig. 2 is a similar view showing the fender folded; Fig. 3 is a detail horizontal section taken on the line 3—3 of Fig. 1; Fig. 4 is a detail sectional perspective view of certain of the parts.

Referring in detail to the drawing, 5 designates the body of a motor vehicle, 6 the front axle thereof, and 7 the front supporting wheels. Upon the axle 6, the bifurcated end 9 of a forwardly extending hollow arm 8 is engaged, and through the spaced portions of the bifurcated end of said arm, rearwardly of the axle, the vertical bolt 10 is disposed, suitable retaining nuts 11 being threaded upon the opposite ends of said bolt. It will be understood that one of the tubular arms 8 is mounted upon the front vehicle axle adjacent to each end thereof and, in the forward end of each arm, a rod 12 is slidably engaged. A coil spring 13 is disposed in the arm between the inner end of this rod and the base wall of the bore of said arm. The outer ends of the spring pressed rods 12 are connected by a horizontal, transversely extending rod 14 which is provided in its periphery with a plurality of spaced circumferential grooves, indicated at 15. In the grooves 15, sleeves 16 formed upon the upper ends of a series of metal bars 17 which constitute the lower section of the fender, are respectively engaged so that said fender section may swing or turn upon the rod 14. The upper section of the fender also consists of a series of spaced flat metal bars 18, the lower ends of which are suitably fixed in the rod 14. The lower ends of the fender bars 17 and the upper ends of the bars 18 are turned upon themselves, as indicated at 19, and the extremities of the respective bars 17 and 18 are connected by the transverse rods 20.

Upon a hanger bracket 21 fixed upon one of the tubular arms 8, a bell crank lever 22 is fulcrumed, as indicated at 23. One arm 24 of said lever is longitudinally bored to slidingly receive a rod section indicated at 25. This rod is provided upon its periphery with a key engaging the complementary key-way formed in the wall of the arm 8. To the outer end of the rod section 25, a second relatively long rod section 26 is pivotally connected, the section 25 being formed on its end with a stop shoulder indicated at 27, to limit the downward swinging movement of the rod 26. The other end of the rod 26 is pivotally connected to one end of the rod 20 which connects the bars 17 of the lower fender section. To the other arm of the bell crank lever 22, one end of a rod 28 is connected, and the other end of said rod is pivotally attached to the lower end of an operating lever 29 which is fulcrumed, as at 30, and provided with the usual spring pressed dog for engagement with the teeth of a rack 31 fixed upon the body of the vehicle.

From the above description, taken in connection with the accompanying drawing, the construction and manner of operation of the device will be clearly and fully understood. In the normal position of the several parts as shown in Fig. 1, the arm 24 of the bell crank lever extends downwardly from the fulcrum 23 at an angle and the rod sections 25 and 26 are in line therewith so that the lower end of the lower movable fender section will be supported out of contact with the ground surface. When the lower fender section strikes against a body in the path of movement of the machine, the operator shifts the lever 29 so as to pull the rod 28 rearwardly and thereby elevate the lower arm 24 of the bell crank lever and the lower fender section through the medium of the rod connections 25 and 26. Thus, the body will be supported upon said fender section and prevented from rolling under the wheels of the vehicle. In this forward and upward movement of the lower fender section, it will be understood that the rod section 25 slides outwardly in the bore of the lever arm 24. When the body strikes upon the fender, said fender will yield rearwardly by reason of the provision of the springs 13 and thus obviate injury to the person due to forcible impact with the fender.

When traveling over country roads where the traffic is light, the fender may be arranged in an inoperative position by simply swinging the lower fender section upwardly against the bars 18 of the upper stationary fender section and securing the two fender sections by chains or in any other suitable manner. This folding movement is permitted owing to the hinge connection between the outer rod section 26 and the rod section 25.

It will thus be seen that I have produced a simple and, at the same time, very effective and reliable fender for automobiles or similar vehicles. The height of the axle above the ground will, of course, vary in different makes of vehicles and, in such cases, it may be necessary to provide the supporting arms 12 with angular extensions as will be obvious to the mechanic skilled in this art. The device is also susceptible of a great many other changes in the form, proportion and arrangement of the several elements employed and I, therefore, reserve the privilege of adopting all such legitimate modifications as may be fairly embodied within the spirit and scope of the invention as claimed.

Having thus fully described my invention, what I desire to claim and secure by Letters Patent is:—

1. The combination with the vehicle axle, of a fender yieldably supported upon said axle and including an upper stationary section and a lower movable section, and manually operable means connected to the lower section of the fender for raising or lowering the same, said means permitting the lower fender section to be swung upwardly against the upper section of the fender to an inoperative position.

2. The combination with the vehicle axle, of supporting arms mounted upon said axle, rods yieldingly slidable in said arms, a fender supported between said rods and including an upper stationary section and a lower pivotally mounted section, and manually operable means connected to the lower fender section for raising or lowering the same, said means permitting of the upward swinging movement of the lower fender section upon said stationary fender section to an inoperative position.

3. The combination with the vehicle axle, of spaced tubular arms mounted upon said axle, a transversely disposed rod yieldably supported by said arms for rearward longitudinal movement with respect to the vehicle, a fender mounted upon said rod and including an upper stationary section and a lower swinging section, a manually operable bell crank lever, and a slidable connection between said bell crank lever and the lower fender section whereby said fender section may be raised or lowered or swung upwardly against the upper fender section to an inoperative position.

4. The combination with the vehicle axle, of spaced supporting arms mounted upon said axle, a transverse rod yieldably mounted in said arms for rearward longitudinal movement with respect to the vehicle, a fender mounted upon said rod including an upper stationary section and a lower swinging section, a manually operable bell crank lever, and relatively movable rods one of which is connected to the lower fender section and the other slidably engaged with one arm of the bell crank lever whereby said lower fender section may be raised or lowered or swung upwardly against the upper fender section to an inoperative position.

5. The combination with the vehicle axle, of spaced supporting arms mounted upon said axle, a transverse rod yieldably mounted in said arms for rearward longitudinal movement with respect to the vehicle, a fender mounted upon said rod including an upper stationary section and a lower swinging section, a manually operable bell crank lever, one arm of the bell crank lever being longitudinally bored, a rod slidably engaged therein, and a second rod pivotally connected at one end to the lower fender section and hingedly connected at its other end to said first named rod whereby the lower fender section may be raised or lowered or swung upwardly against the upper fender section to an inoperative position.

In testimony whereof I hereunto affix my signature in the presence of two witnesses.

FRANK E. THELEN.

Witnesses:
  CASPER HALLBERG,
  CHAS. R. KJELLSTRAN.